W. W. KEMP AND W. H. VAN HORN.
AUTOMATIC AIR AND GAS MIXING MACHINE.
APPLICATION FILED FEB. 9, 1915.

1,420,658.

Patented June 27, 1922.
5 SHEETS—SHEET 1.

Witnesses
H. C. Rohuette
J. L. Mawhinney

Inventor
William W. Kemp
William H. Van Horn
By
Attorney

W. W. KEMP AND W. H. VAN HORN.
AUTOMATIC AIR AND GAS MIXING MACHINE.
APPLICATION FILED FEB. 9, 1915.
1,420,658.
Patented June 27, 1922.
5 SHEETS—SHEET 2.
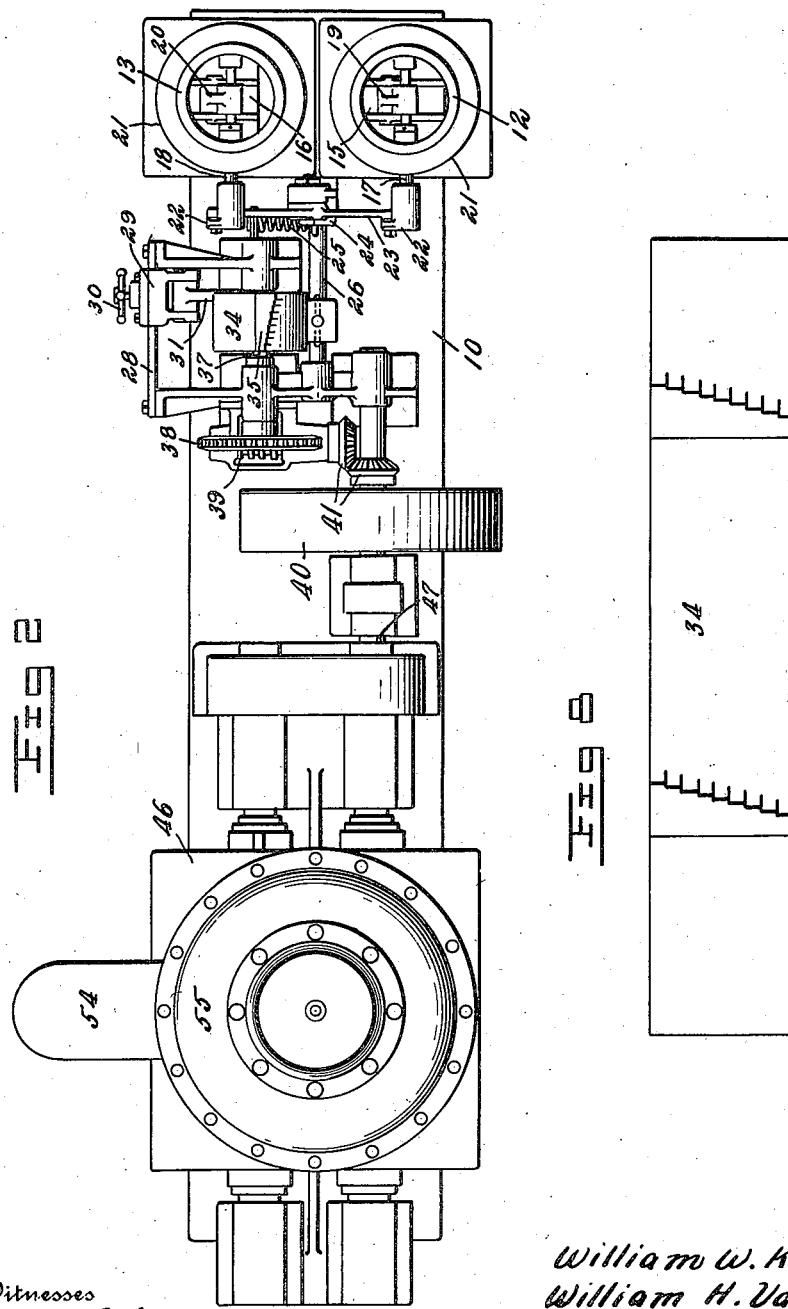

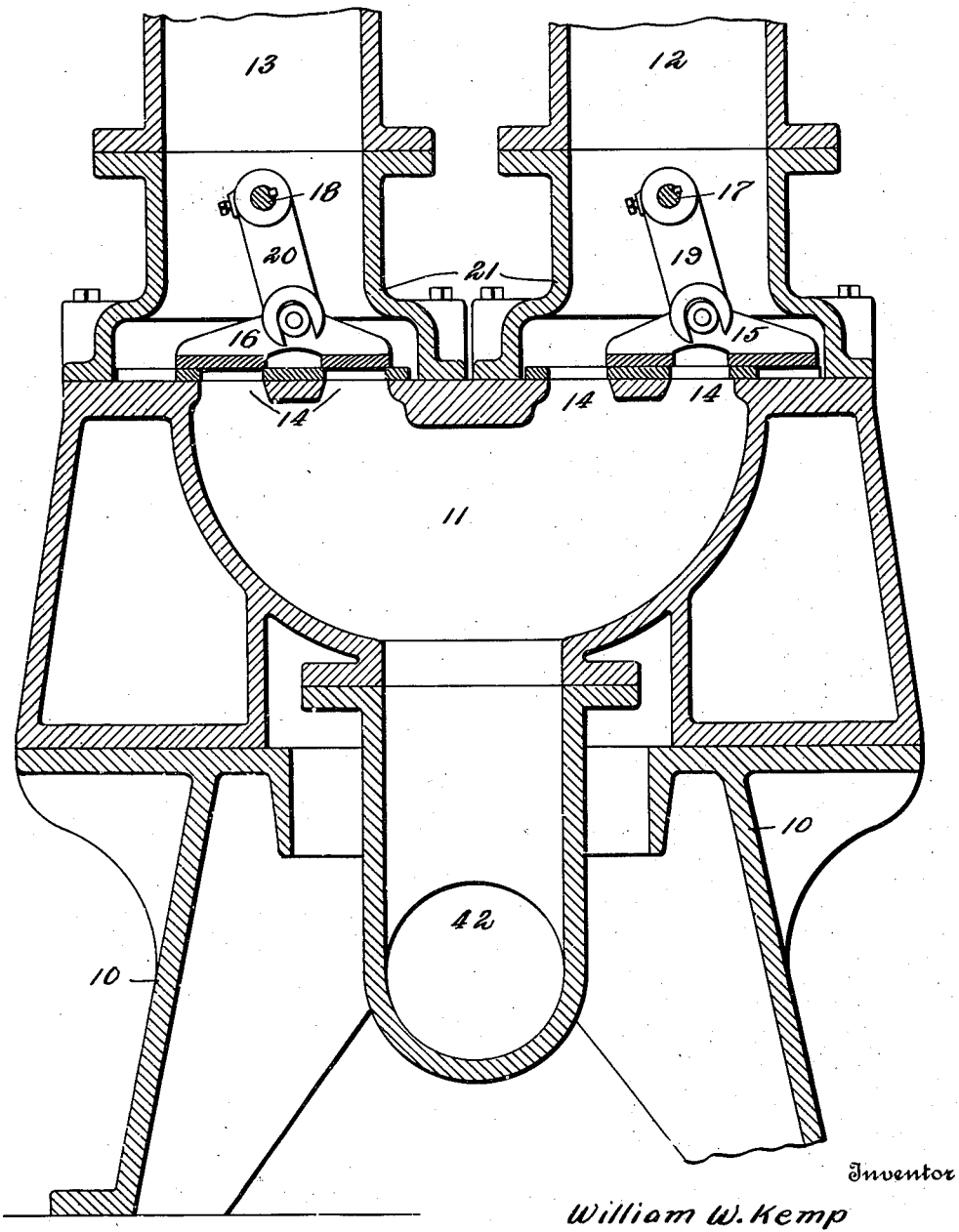

W. W. KEMP AND W. H. VAN HORN.
AUTOMATIC AIR AND GAS MIXING MACHINE.
APPLICATION FILED FEB. 9, 1915.
1,420,658.
Patented June 27, 1922.
5 SHEETS—SHEET 4.
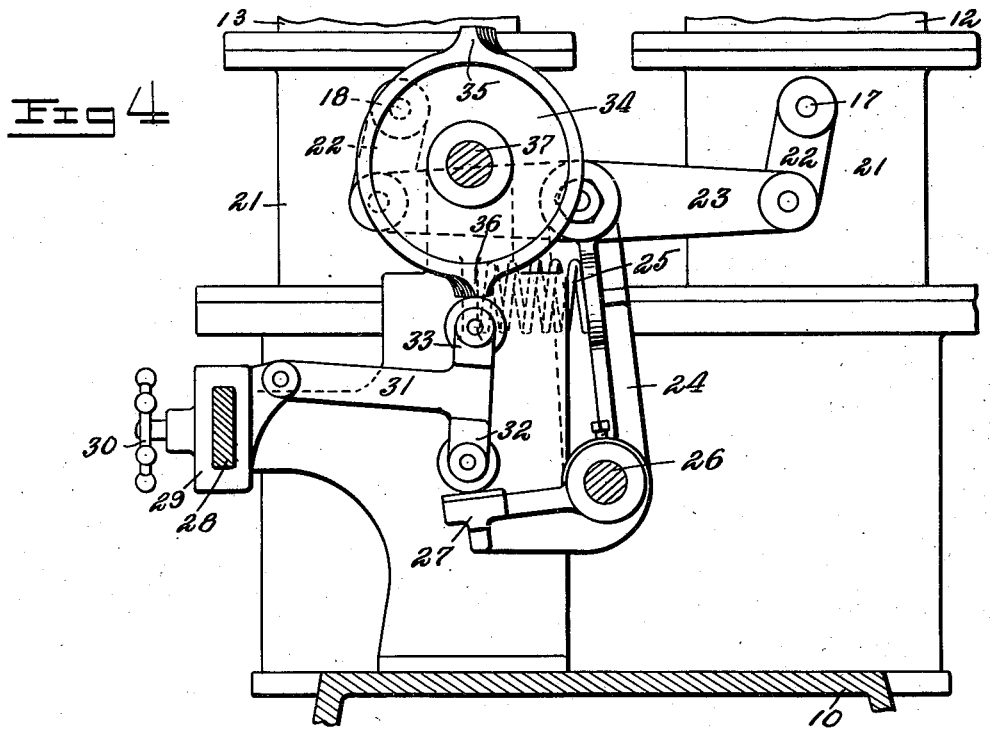
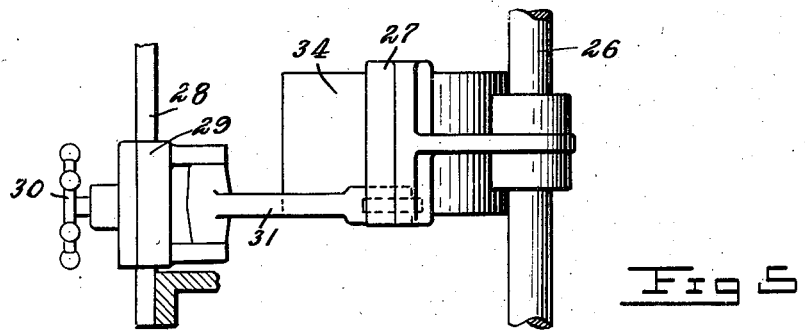

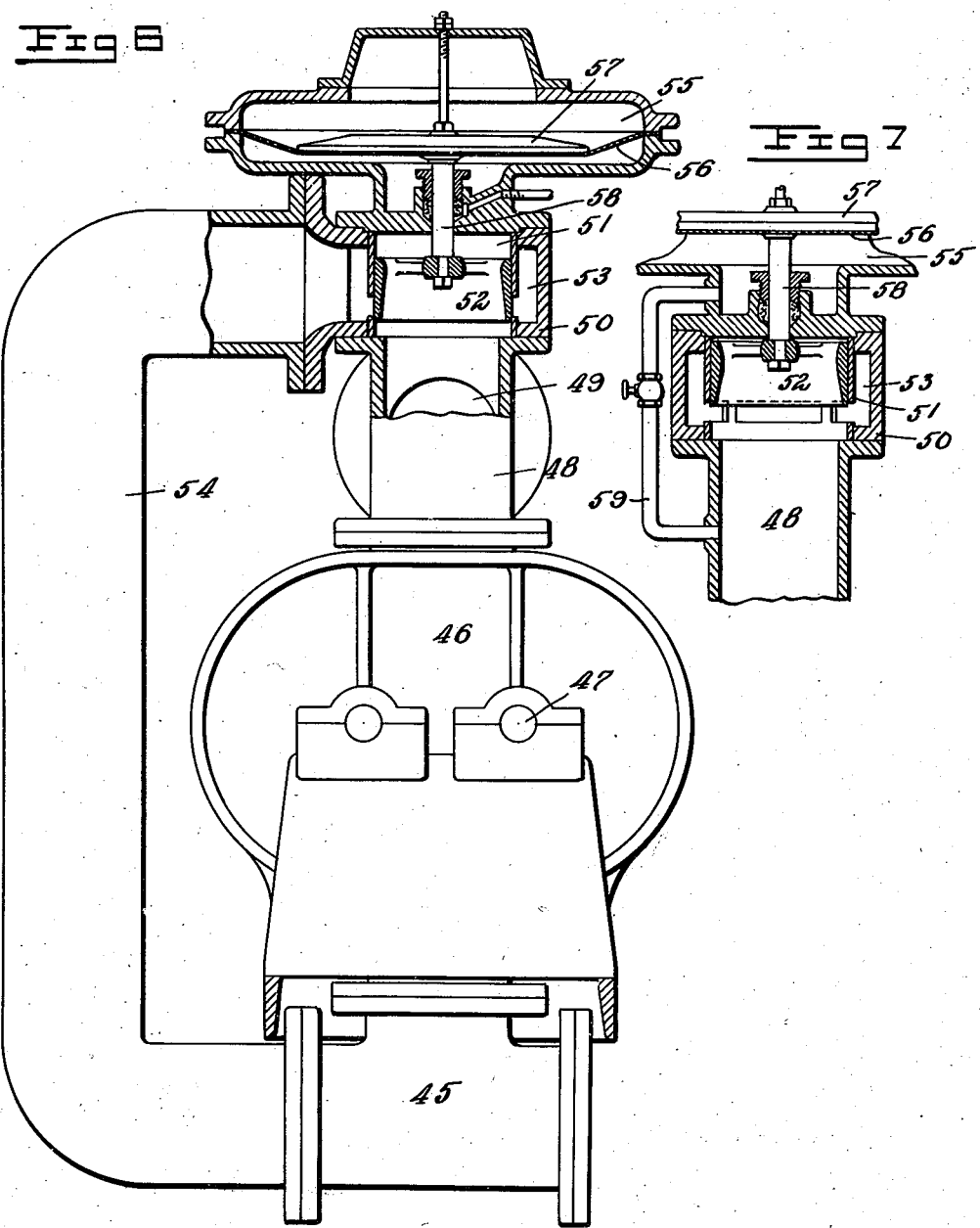

UNITED STATES PATENT OFFICE.

WILLIAM W. KEMP AND WILLIAM H. VAN HORN, OF BALTIMORE, MARYLAND.

AUTOMATIC AIR AND GAS MIXING MACHINE.

1,420,658.  Specification of Letters Patent.  Patented June 27, 1922.

Application filed February 9, 1915. Serial No. 7,138.

*To all whom it may concern:*

Be it known that we, WILLIAM W. KEMP and WILLIAM H. VAN HORN, citizens of the United States, residing at Baltimore city, in the State of Maryland, have invented new and useful Improvements in Automatic Air and Gas Mixing Machines, of which the following is a specification.

This invention relates to fluid mixing apparatus or machines; and particularly to machines for mixing manufactured or natural gas with air to produce a gas that will burn with perfect combustion, and by the use of which Bunsen burners may be dispensed with, and the fire at the point of consumption be controlled by a single valve.

An object of this invention is to provide a machine for mixing air and gas which is automatic, which embodies a simple construction and combination of proportioning and pressure regulating means for the fluids, which presents a compact structure, which is of high efficiency, which is capable of a great latitude of adjustment, and which is positive in operation.

A further object of the invention is to provide a machine of this character with a plurality of devices adapted to interrupt the flow of the separate fluids; and to provide a control for the separate devices which will periodically operate the same to uniformly proportion the fluids, the control being adjustable to vary the periods of operation thereof so as to change the relative proportions of the fluids as desired.

In the following detail description of the present preferred embodiment of this invention, the above and other various objects and advantages of this invention will be more clearly brought out, the same being shown in the accompanying drawings wherein,—

Fig. 2 is a top plan view of the same.

Fig. 3 is an enlarged vertical transverse section of one end of the machine taken through the inlet chamber and the air and gas inlets, disclosing the valves controlling the inlets.

Fig. 4 is a detail enlarged transverse sectional view of the machine taken through the valve operating and controlling mechanism.

Fig. 5 is a fragmentary bottom plan view of the same.

Fig. 6 is a detail enlarged elevational view of one end of the machine, parts of the pressure regulator thereof being shown in section.

Fig. 7 is a sectional view through the pressure regulator taken at right angles to the showing in Fig. 6.

Fig. 8 is a plan view of the development of the cam of the operating mechanism.

Referring to these drawings, wherein like parts are designated by similar characters of reference throughout the several views, 10 designates a base or frame of any approved construction and form capable of supporting in compact position the hereinafter described parts.

Figure 1:
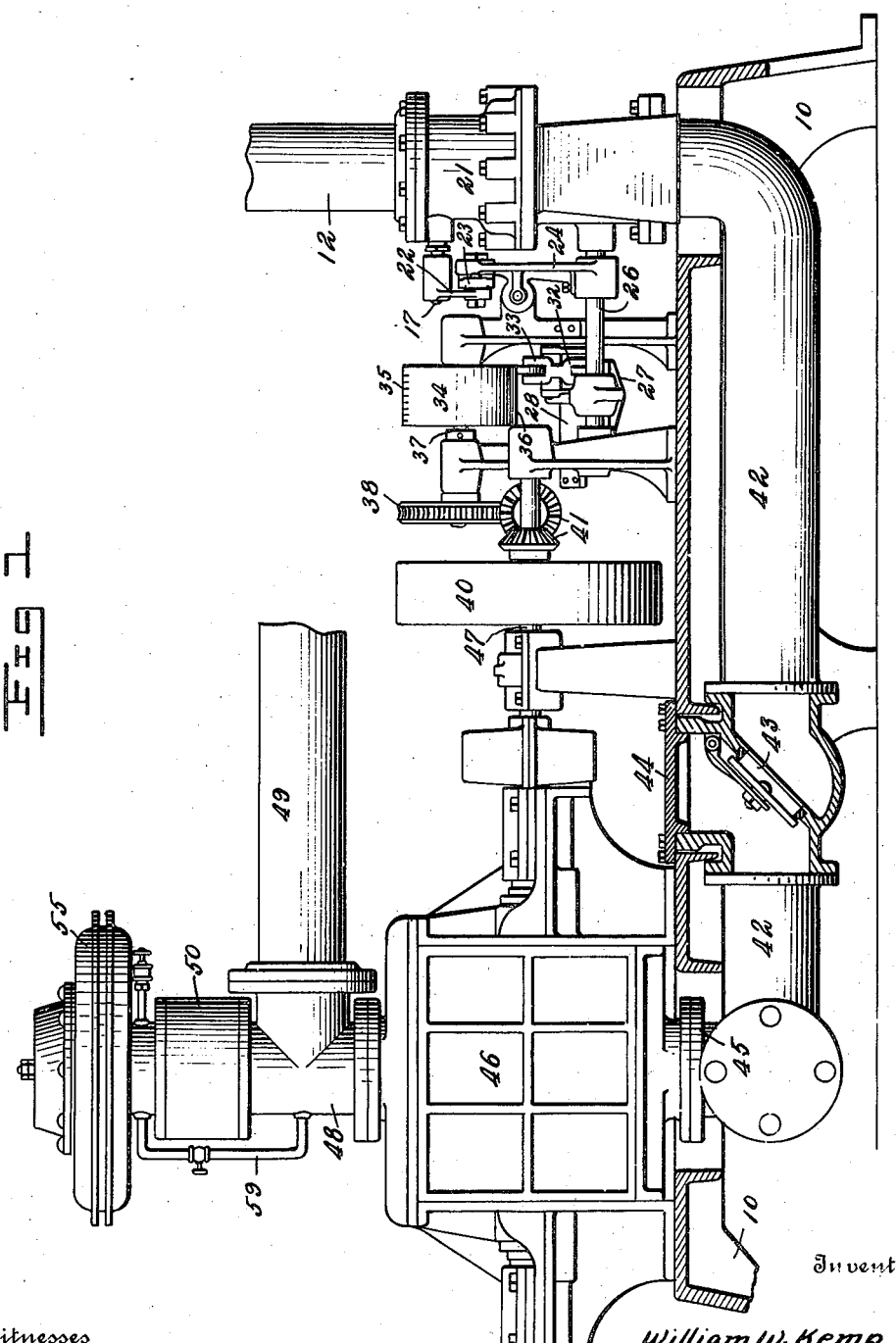
Fig. 1 is a side elevation of the complete automatic air and gas mixing machine of this invention.

Mounted upon one end of the base 10 is an inlet chamber 11, the same being in the form of a Y, one branch of which is connected to a gas inlet 12, while the opposite branch is connected to an air inlet 13. The inlet chamber 11 is preferably vertically arranged as shown, has a flat top, and is provided in each branch with apertures or openings 14 controlled by slide valves 15 and 16 in the gas and air passages respectively, whereby to control the flow of gas and air through the passages into the inlet chamber 11.

The means for operating the slide valves 15 and 16, as shown in Figs. 1, 3, 4 and 5, comprises separate shafts 17 and 18 connected by arms 19 and 20 to the valves.

The shafts 17 and 18 project through the sides of the valve casings 21 which house the valves, and have upon their outer ends crank arms 22 joined at their free ends by a link 23. The link 23 is pivoted at its intermediate portion to a rocker arm 24 normally held in position by a spring 25, to retain the valve 16 open and the valve 15 closed. The rocker arm 24 is mounted upon a rock shaft 26 suitably journaled in the base or frame 10, and provided with a relatively wide foot 27, as may be best seen from Fig. 5. Thus the valves 15 and 16 are so connected together and arranged with respect to the openings 14 that when one of the openings is uncovered the other is closed, and vice versa, whereby an alternate operation of the gas and air supply is effected.

A guide bar 28 is mounted upon the frame 10 and carries a sleeve 29 adjustably secured to the bar 28 by a hand screw 30. The sleeve 29 has suitably pivoted thereon a trip 31 in the form of a T the long arm of which has pivotal engagement with the sleeve 29. The shorter arms 32 and 33 of the T project in opposite directions, are provided with anti-friction rollers, and bear respectively upon the foot 27 and upon an overhanging cam 34 suitably mounted for rotation on the base.

The cam 34 is of a width substantially equal to the width of the foot 27, and is provided, preferably at diametrically opposite points, with transverse series of projections 35 and 36. The projections 35, as may be seen from Figs. 2 and 8, terminate at one side in a line parallel to the axis of the cam, and at their opposite sides in a line which is oblique to the axis of the cam. This arrangement or formation of the projections 35 provides a row or series of projections which extends from side to side of the cam, and which successively increase in width from end to end of the row. The outer surfaces 35$^a$ and 36$^a$ of the projections 35 and 36, respectively, and the periphery 34$^a$ of the body portion of the cam are concentric to the axis of rotation of the cam. The projections 36 are of like form and arrangement to the projections 35 so as to duplicate the action of the projections 35 in one revolution of the cam 34.

The cam 34 is mounted upon a shaft 37 having a spur gear 38 meshing with a worm 39, the latter being operated by the drive pulley 40 through the bevel gears 41.

The inlet chamber 11 opens at its lower end into a main pipe 42, the latter extending preferably longitudinally of and beneath the base 10, and having at an intermediate point a check valve 43 to prevent the backward flow of the mixture through the main passage 42 and into the inlet chamber and supply pipes or inlets. While the check valve 43 may be of any approved construction, it is preferably as shown, and a cap plate 44 is provided by the removal of which access may be had to the check valve 43.

The main pipe 42 extends to the opposite end of the base 10, and terminates in a T 45. The T 45 opens into a suction pump 46 of any approved construction, which is operated by the driving pulley 40 through the main shaft 47 and parts connected thereto.

A second T 48 mounted upon the top of the pump, has one branch thereof leading to a distributing or outlet pipe 49, and its opposite branch opening into a pressure regulator casing 50.

The casing 50 is provided with a central piston valve chamber 51, in which is mounted a piston valve 52, and has in its wall an annular channel or passage 53 for communication with the T 48 when the piston valve 52 is in open position. The passage 53 is connected to a return pipe 54 which is carried laterally from the casing 50 and downwardly beneath the base 10 to the lower T 45.

Above the casing 50 there is suitably arranged a diaphragm chamber 55 in which is a diaphragm 56, weighted as at 57, and having a depending stem 58 connected to the valve 52 for the purpose of effecting the simultaneous movement of the diaphragm and the valve. The diaphragm 56 divides the chamber 55 into upper and lower compartments, the lower compartment having direct communication with the upper T 48 through a by-pass pipe 59, as shown to advantage in Fig. 7.

In the present instance, the weighted diaphragm 56 is connected to a rod 57$^a$ passing through the top of the diaphragm casing, the upper end of the rod being threaded to receive a nut 57$^b$, by means of which the diaphragm 56 and the valve 52 carried thereby may be adjusted. If desired, the valve may be prevented from moving into a totally closed position by adjusting the nut upon the rod 57$^a$, and if such adjustment is made, it will be seen that the T 48 is always in communication with the by-pass 54.

The operation of this improved automatic air and gas mixing machine is as follows:—

The main shaft 47 is driven in any suitable manner through the drive pulley 40 not only to set the suction pump 46 into operation, but also to rotate the cam 34. The operation of the suction pump 46 creates a suction in the main pipe 42 and compels the gas and air to be delivered to the inlet or receiving chamber 11. The valves 15 and 16 interrupt the flow of the gas and air respectively to the inlet chamber 11, and are controlled by the rotating cam 34 to correctly proportion the mixture of the gas and air.

As the cam 34 rotates, the projections 35 and 36 are automatically brought into engagement with the trip 31, as may be seen from Fig. 4, to depress the trip 31 and the foot 27, rock the shaft 26 and the arm 24 against the tension of the spring 25, and shift the link 23 to move the valves 15 and 16 into a new position, as shown in Fig. 3. The valves are held in this new position for a period equal to the length of time required for the outer concentric surfaces 35$^a$ or 36$^a$ of the projections, 35 or 36, to pass the trip 31. As the projections, 35 and 36, consecutively increase in width from side to side of the cam, such period may be lengthened or shortened by changing the position of the trip 31 between the foot 27 and the cam 34. For instance, from Figs. 4 and 5, it will be noted that the trip 31 is adjusted to hold the valves in tripped position for the shortest period of time for which the machine is adapted, the trip being so adjusted that it engages the nearest and smallest projection 35, as seen in Fig. 4. Should it be desired to lengthen the period of time for holding the valve in the tripped position, it is only necessary to slide the sleeve 29 along the horizontal guide bar 28 to bring the trip 31 opposite to the projection 35, or 36, of the desired width, when upon the operation of the machine the valves will be tripped and held in such position during such desired period.

From Fig. 3 it will be noted that the valves are in their tripped position, or in the position imposed on them by the periodic action of the cam 34. In this position the valve 15 is open whereby the gas may freely enter the inlet chamber 11, and the valve 16 is closed, whereby to shut off the flow of air to the inlet chamber. As the cam continues its rotation the projection 35 or 36 moves out of engagement with the roller upon the trip 31 and the arm 24, under tension of the spring 35, moves in a direction to open the air valve 16 and close the gas valve 15. During the interval in which the roller upon the trip is passing from the outer concentric surface 35ª or 36ª of one of the projections to the periphery 34ª of the cam, the valves are being shifted simultaneously permitting air and gas to flow simultaneously into the chamber 11, and while this interval of time is very small, the amount of air and gas admitted is appreciable.

The suction pump 46 draws the admixed air and gas through the main pipe 42, past the check valve 43, and into the pump 46. The admixture is then forced from the pump 46 into the upper T 48, and out through the distributing or outlet pipe 49 to the desired point of consumption, expansion tank, or the like.

During the normal operation of the apparatus, the valve 52 is always open to some extent to allow a portion of the fluids to pass from the outlet side of the suction pump through the by-pass 54 to the inlet side of the suction pump. If a larger percentage of the mixture delivered by the suction pump 46 is led off through the outlet pipe 49 for consumption, the pressure in the upper T 48 tends to fall resulting in a decreased pressure under the diaphragm 56 of the pressure regulator, and permitting the valve 52 under gravity to move downwardly to less open position, and thus the amount of fluid which is by-passed is decreased whereupon the pressure in the T 48 immediately rises to normal. If but little gas is consumed, the pressure within the upper T 48 tends to increase, but the increase in pressure is momentary only, for the increased pressure is communicated through the pipe 59 to the lower side of the diaphragm 56 which raises and lifts the valve 52 to a more open position so that a larger amount of air and gas is by-passed through the by-pass 54 to the inlet side of the pump.

It will be noted that uniform pressure of the air and gas mixture is automatically maintained in the outlet pipe 49 for upon fluctuation of the amount of mixture consumed the diaphragm is effected to raise or lower the valve 52 and thus vary the amount of mixture by-passed, the greater the consumption, the smaller amount of mixture being by-passed, and vice versa. The tendency for the pressure to vary is momentary only for, upon the slightest fluctuation, the valve 52 is moved to vary the amount of mixture by-passed and the pressure is immediately brought to normal. When the device is operating within its capacity, the valve 52 is always open to permit communication between the T 48 and the by-pass 54, but should the amount of gas consumed exceed the capacity of the device, the valve 52 will move into wholly closed position and the pressure in the outlet pipe would drop resulting in a less efficient operation of the machine. If desired, the valve 52 may be so adjusted that it will not move into totally closed position, although the machine is operating beyond its capacity, in which case, part of the admitted fluids would be by-passed, but the pressure in the outlet pipe would be materially decreased.

It will be seen that the gas and air inlet valves 15 and 16 continue to operate at the same rate of speed irrespective of the amount of mixture consumed, or the amount of mixture by-passed. The air and gas inlet valves operate continuously and this is true although the entire amount of mixture in the device is by-passed through the pipe 54, which occurs when none of the mixture is taken or drawn from the apparatus through the pipe 49 for consumption.

It will be noted from Fig. 3 that the receiving chamber 11 has a plurality of openings 14 for each of the fluid inlets 12 and 13, two for each inlet being shown in the present disclosure, and that the valves 15 and 16 are made with a corresponding number of faces. This construction of valve and valve ports or openings admits of the opening of a relatively large area of the port by the relatively small movement of the valve.

The apparatus as disclosed, having the chamber 11 and the mixture feeding pipe 42, will, of course, bring about a mixture of the incoming fluids from the pipes 12 and 13, but obviously the fluids may be delivered from the outlet pipe 49 in proper proportions and to a considerable extent commingled to any suitable reservoir or receiver from which the mixture may be led to the burners or other devices.

It has been found that due to the rapidity with which the valves are shifted, the fluids are admitted in small amounts or blocks to the inlet chamber 11, and as, at certain intervals, air and gas are admitted simultaneously to the inlet chamber 11, the tendency of the gas to stratify is negligible. We have also found that the by-pass 54 aids in the prevention of stratification of the gases, for this by-pass provides a means for maintaining the fluids in circulation.

In a machine of this character it is found necessary to provide ports of large cross-sectional area, and to provide correspondingly large valves. If the well known poppet valve were employed, and made to the required size, it would be too heavy and cumbersome for the satisfactory operation of the machine. To overcome this difficulty applicants have conceived the above described slide valves of the peculiar form shown, wherein the valves have a plurality of seating faces to control the corresponding number of component openings constituting the entire large port. The valve operating and controlling mechanism has been devised to impart the necessary slight reciprocating movement to the valves without shock to the valves and their parts, and to conform to the compactness of the entire machine.

The above described parts are all assembled upon a single base, are so formed and interconnected as to provide for a relatively compact and simple machine reduced to a minimum number of parts, and a machine which is positive in operation and which at the same time is flexible as to a variety of adjustments.

It is of course understood that various changes within the scope of the following claims may be made in the details of the above described embodiment of this invention, and that the parts may be of any desired design without departing from the spirit of the invention.

What is claimed is—

1. In a machine as specified; air and gas inlets; a valve for each inlet; a connection between the valves to maintain one of the same open while the other is closed and admit one fluid at a time to the machine; means for periodically shifting the valves to change the fluid delivered to the machine; and means for changing the period of shifting of the valves.

2. In a machine as specified; inlets for separate fluids; a valve for each inlet; a positive connection between the valves to maintain the same in alternate relation whereby to admit one fluid at a time to the machine; and means for periodically shifting the valves to change the fluid delivered.

3. In a machine as specified; a receiving chamber having a plurality of inlet ports; a valve for each port; a link connecting said valves for alternately opening and closing the same; a rocker arm connected to the link; a shaft supporting said arm; a foot on said shaft; and a single rotary cam having projections thereon for depressing said foot and simultaneously actuating both of said valves.

4. In a machine as specified, an inlet chamber, a plurality of inlet ports opening into the chamber, a valve for each port, means connecting the valves, a single cam for engagement with said means to periodically actuate the same to operate said valves simultaneously, and means for effecting relative movement between the cams and said means connecting the valves for changing the period of operation of the cam to vary the length of time the valves are closed and opened.

5. In a machine as specified, a receiving chamber having a plurality of inlet ports, a valve for each port, means connecting said valves to simultaneously operate the same for alternate opening and closing, a single cam for engagement with said means whereby to operate the valves simultaneously, and means for effecting relative movement between the cam and said means connecting the valves for changing the period of operation of the cam to vary the length of time the valves are closed and opened.

6. In a machine as specified; a receiving chamber having inlet ports; a valve for each port; a link connecting the valves; a presser foot connected to the link; a rotating cam having a transverse row of projections on the side thereof consecutively increasing in width from end to end of the row; and a trip adjustable between the cam and the presser foot adapted to register with any one of said cam projections.

7. In a machine as specified; a receiving chamber having a plurality of inlet ports; a valve for each port; a link connecting the valves; a rock shaft connected to said link for simultaneously operating the valves; a presser foot on said rock shaft; a cam spaced from said presser foot and having a transverse row of consecutively enlarged projections on one side thereof; and an adjustable trip between the presser foot and the cam adapted for registration with any one of said projections whereby to adjust the period of depression of said foot as desired.

8. In a machine as specified; a receiving chamber having a plurality of inlets; a valve for each inlet; a link connecting said valves for simultaneous operation; a rock shaft connected to said link; a spring urging said rock shaft in one direction to retain the valves in normal position; a presser foot on the rock shaft; a rotating cam having a plurality of graduated projections; and a trip adjustable between the presser foot and the cam and adapted for registry with any one of said projections whereby to maintain said foot in depressed position for the period desired.

9. In a machine as specified; a receiving chamber having inlet ports; valves controlling said ports; mechanisms connecting said valves to simultaneously operate the same; means normally and yieldingly holding the valves in one position; a presser foot connected to said mechanism; a trip engaging the presser foot; a cam in the path of said trip for periodically actuating the same to change the position of the valves; said trip being adjustable relative to the cam whereby to change the period of operation of the valves.

10. In a machine as specified; a receiving chamber having a plurality of inlet ports; valves controlling the ports; mechanism connecting the valves for simultaneous operation and including a presser foot; a uniformly rotating cam; a row of graduated projections upon the cam; and a trip between the cam and said presser foot whereby said cam periodically depresses said foot to change the position of said valve, said trip being adjustable whereby to change the length of the period of operation of said cam.

11. In a fluid mixing apparatus; a base; a plurality of fluid inlet passages on the base; an inlet chamber into which said pipes empty; a valve for each pipe at its entrance to said chamber; a link connecting said valves; a trip connected to said link; a cam in the path of said trip adapted to engage the same to open all of said valves; and manually adjustable means associated with said cam and said trip whereby to vary the period of valve opening.

12. In a machine as specified; air and gas inlets; slide valves controlling the inlets; means connecting said valves; means for feeding air and gas under pressure through the inlets; means for automatically and periodically actuating said valve connecting means to open and close said valves; and manually adjustable means for changing the period of operation of said valves.

13. In a fluid mixing apparatus; the combination with an inlet chamber; and means for feeding a plurality of fluids under constant pressure to said chamber; of a slide valve for controlling each fluid; means connecting said valves for simultaneous movement; means for automatically and intermittently opening said slide valves; and manually adjustable means for varying and controlling the period of retaining said slide valves open.

14. In a fluid mixing apparatus, the combination of a chamber, air and gas inlets communicating with said chamber, valves arranged to close and open said inlets, means for feeding air and gas through said inlets, and means controlling movement of said valves whereby separate flows of gas and air will be alternately admitted to the chamber and flows of both air and gas admitted between the periods of said separate flows.

15. In a fluid mixing apparatus, the combination of a chamber, means for feeding two fluids under pressure to said chamber, a valve controlling the flow of each fluid to the chamber, and means for automatically actuating the valves to permit admission to said chamber alternately of separate bodies of each fluid and the simultaneous admission of both fluids between the periods of admission of the separate fluids.

16. In a machine as specified; air and gas inlets; slide valves controlling said inlets; means for feeding air and gas through the inlets; and means for actuating said valves, the parts being so related as to admit air and gas at different intervals, and admit air and gas simultaneously between the periods of separate admission of the fluids.

17. In a machine as specified; an inlet chamber; a plurality of inlet ports opening into said chamber; means for feeding a plurality of fluids under pressure to said chamber; a valve for each port; means connecting the valves; and a cam having a projection provided with a concentric outer surface for engagement with said valve connecting means; one of said valves being in open position, and the other in closed position when said connecting means is in engagement with the periphery of the cam, said valves being in reverse position when the concentric surface of the projection is in engagement with said connecting means, and all of said valves being simultaneously shifted when said connecting means is moving from engagement with either the periphery of the cam or the outer surface of the projection to the other of these surfaces.

18. In a machine as specified, a mixing chamber; two inlet ports opening into said chamber, means for feeding two fluids under pressure through said ports respectively, a valve for each port, means for actuating both said valves to permit admission to the chamber alternately of the separate fluids and admission of both fluids between the periods of admission of the separate fluids, an outlet from said chamber, and means for maintaining the pressure of the mixture flowing through said outlet constant.

19. In a machine as specified, a mixing chamber; two inlet ports opening into said chamber, means for feeding two fluids under pressure through said ports respectively, a valve for each port, means for actuating both said valves to permit admission to the chamber alternately of the separate fluids and admission of both fluids between the periods of admission of the separate fluids, an outlet from said chamber, and means whereby the valves controlling the inlet ports may operate uniformly and regularly entirely independent of the amount of mixture passing through the outlet.

20. In a machine as specified, a mixing chamber; two inlet ports opening into said chamber, means for feeding two fluids under pressure through said ports respectively, a valve for each port, means for actuating both said valves to permit admission to the chamber alternately of the separate fluids and admission of both fluids between the periods of admission of the separate fluids, an outlet from said chamber, burners communicating with the outlet, and means whereby the valves will be operated uniformly independent of any variation in the amount of mixture consumed by the burners.

21. In a machine as specified, the combination of a mixing chamber, two inlet ports opening into said chamber, means for feeding two fluids under pressure through said ports respectively, a valve for each port, and means for actuating the valves to effect admission of the separate fluids alternately to the chambers and admission of both fluids between the periods of admission of the separate fluids.

22. In a machine as specified, the combination of a mixing chamber, two inlet ports opening into said chamber, means for feeding two fluids under pressure through said ports respectively, a valve for each port, and a common means for actuating both said valves, the valves and ports being so related that the two fluids will be admitted separately to the chamber alternately and simultaneously between the periods of admission of the separate fluids.

In testimony whereof we have hereunto set our hands in presence of two subscribing witnesses.

WILLIAM W. KEMP.
WILLIAM H. VAN HORN.

Witnesses:
GERTRUDE M. STUCKER,
F. M. GETZ.